US012141090B2

(12) United States Patent
Narayanan et al.

(10) Patent No.: US 12,141,090 B2
(45) Date of Patent: Nov. 12, 2024

(54) APPLICATION ACCELERATION PORT INTERFACE MODULE EMBODIMENTS

(71) Applicant: DELL PRODUCTS L.P., Round Rock, TX (US)

(72) Inventors: Padmanabhan Narayanan, Redmond, WA (US); Raja Sathianarayan Jayakumar, Fremont, CA (US); Anoop Ghanwani, Roseville, CA (US); Per Henrik Fremrot, Novato, CA (US)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 17/870,264

(22) Filed: Jul. 21, 2022

(65) Prior Publication Data

US 2024/0028545 A1 Jan. 25, 2024

(51) Int. Cl.
*G06F 13/40* (2006.01)
*G06F 1/18* (2006.01)
*G06F 1/20* (2006.01)

(52) U.S. Cl.
CPC .......... *G06F 13/4068* (2013.01); *G06F 1/189* (2013.01); *G06F 1/206* (2013.01)

(58) Field of Classification Search
CPC ....... G06F 13/4068; G06F 1/189; G06F 1/206
See application file for complete search history.

(56) References Cited

U.S. PATENT DOCUMENTS

| 5,544,006 | A  | * | 8/1996  | Radloff    | G06F 1/186 361/756 |
| 5,963,431 | A  | * | 10/1999 | Stancil    | G06F 1/186 361/796 |
| 6,572,403 | B2 | * | 6/2003  | Reimund    | H01R 25/006 439/507 |
| 7,102,893 | B1 | * | 9/2006  | MacArthur  | G02B 6/4452 385/88 |
| 8,107,256 | B1 | * | 1/2012  | Kondrat    | H05K 7/1429 361/796 |
| 9,847,911 | B1 | * | 12/2017 | Gigandet   | H04L 41/0886 |
| 11,502,433 | B2 | * | 11/2022 | Chou       | H01R 13/6658 |
| 11,703,649 | B2 | * | 7/2023  | Rivaud     | H05K 7/1425 361/800 |
| 2004/0257763 | A1 | * | 12/2004 | Andresen   | H05K 7/1487 361/679.48 |
| 2005/0276004 | A1 | * | 12/2005 | Hsu        | G06F 1/181 361/679.02 |

(Continued)

*Primary Examiner* — Faisal M Zaman
(74) *Attorney, Agent, or Firm* — BAUGH LAW, LLC

(57) ABSTRACT

Embodiments herein provide more efficient, more flexible, and more cost-effective ways to provide additional and/or increased functionality to an information handling system. Presented herein are embodiments of an application acceleration port interface module (which embodiments may be referred to herein for convenience as "AAPIM") into which pluggable I/O (input/output) modules may be inserted and the other ends inserted into ports of an information handling system to provide the information handling system with increase capabilities (e.g., increased resource, such as added processing, and increased services, such as new applications or accelerated services). AAPIM embodiments are versatile solutions to address application acceleration needs that can be quickly reprogrammed to address specific needs of a user.

20 Claims, 10 Drawing Sheets

(56) References Cited

U.S. PATENT DOCUMENTS

| | | | |
|---|---|---|---|
| 2006/0256603 A1* | 11/2006 | Foster, Sr. | G11C 5/04 |
| | | | 365/63 |
| 2010/0103627 A1* | 4/2010 | Nelson | G05B 19/0421 |
| | | | 361/730 |
| 2010/0254096 A1* | 10/2010 | Kim | G06F 1/185 |
| | | | 361/737 |
| 2012/0082168 A1* | 4/2012 | Sunaga | G02B 6/4246 |
| | | | 370/401 |
| 2015/0177818 A1* | 6/2015 | Assar | G06F 1/3287 |
| | | | 713/310 |
| 2019/0079890 A1* | 3/2019 | Matula | G06F 13/4045 |
| 2019/0228308 A1* | 7/2019 | Zhou | G06N 20/00 |
| 2019/0269040 A1* | 8/2019 | Gao | H05K 7/1488 |
| 2019/0373754 A1* | 12/2019 | Norton | H05K 7/1491 |
| 2020/0371828 A1* | 11/2020 | Chiou | G06F 9/5055 |
| 2020/0389976 A1* | 12/2020 | Ganor | H05K 7/1491 |
| 2021/0365084 A1* | 11/2021 | Chang | G06F 13/4004 |
| 2022/0012206 A1* | 1/2022 | Bross | G06F 13/4072 |
| 2022/0190546 A1* | 6/2022 | Williams | H04B 10/293 |
| 2022/0190921 A1* | 6/2022 | Chen | G02B 6/4269 |
| 2023/0043794 A1* | 2/2023 | Winzer | G02B 6/4261 |
| 2023/0061937 A1* | 3/2023 | Osterberg | G06F 13/4081 |

* cited by examiner

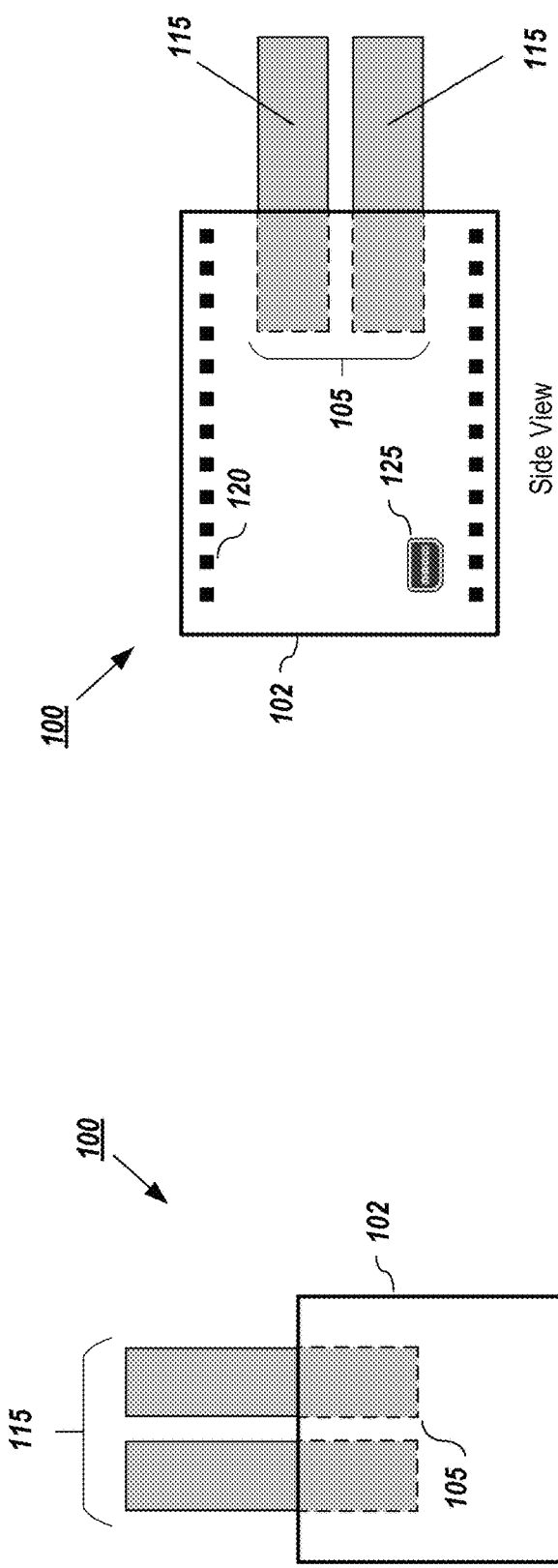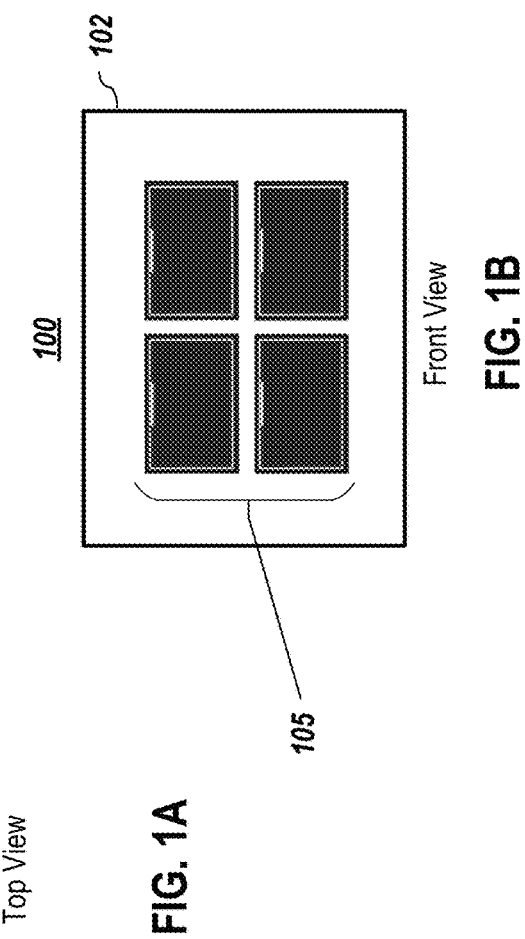

APPLICATION ACCELERATION PORT INTERFACE MODULE EMBODIMENTS

BACKGROUND

A. Technical Field

The present disclosure relates generally to information handling system. More particularly, the present disclosure relates to acceleration units for information handling systems.

B. Background

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Due to increasing demands, changes in technology, changes in requirements, or other factors, it may be desirable to increase functionality or increase performance of an information handling system. However, it is not always possible or economical to expand an existing information handling system. For example, smaller form factor networking information handling systems, such as switches—typically referred to as 1 RU (rack unit) devices or pizza boxes (due to their resemblance to pizza boxes)—tend to have fixed configuration or very limited ability to change configurations due to a number of reasons. First, their fixed and limited size means that there is little to no extra space to add additional hardware. Second, such devices are typically targeted to entry level markets (i.e., to be low-cost devices); thus, to keep costs low, there little, if any, support for post-build options. Third, as a practical matter, the fixed nature of such devices makes them very difficult to expand, especially in the field.

The issue of wanting increased functionality is not limited to just lower-end information handling systems. Higher-end systems can also suffer from a need for better performance or support for additional features. As telecommunications companies (Telcos), enterprises, and service providers move network functions closer to workloads in the cloud and edge, new use cases are emerging that necessitate application acceleration capabilities on information handling systems, such as switches. However, if there is not a feature card available, the device's performance cannot be upgraded. Also, if there is not an available slot for a new feature card, the device similarly cannot be upgraded. To add complexity, if there is a problem with a new card, the entire system may need to be sent for service, which can be costly and disruptive.

Accordingly, it is highly desirable to find new, more efficient, more flexible, and more cost-effective ways to provide additional and/or increased functionality to an information handling system.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

Figures ("FIG.") 1A-D depict different views of an application acceleration port interface module (AAPIM), according to embodiments of the present disclosure.

DETAILED DESCRIPTION OF EMBODIMENTS

Figure 1D:
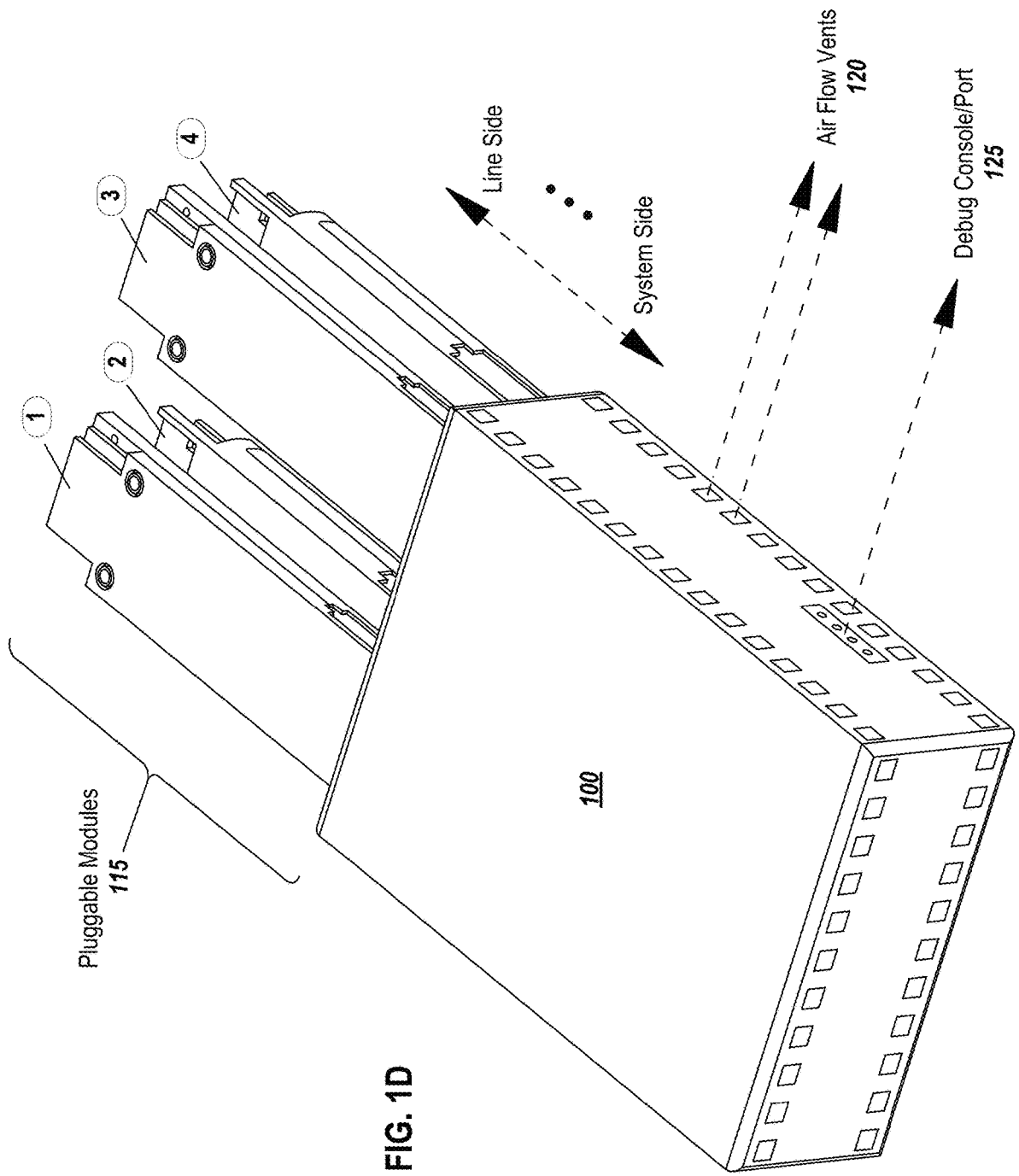

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," "comprising," and any of their variants shall be understood to be open terms, and any examples or lists of items are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

It shall be noted that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall also be noted that although embodiments described herein may be within the context of networking or networking switches, aspects of the present disclosure are not so limited. Accordingly, the aspects of the present disclosure may be applied or adapted for use in other contexts.

A. General Introduction

Networking information handling systems, such as switches, support ports speed covering a range from 1G (gigabits per second) and below to 400G and above to provide customers with a wide possible range of connectivity options. As telecommunications companies (Telcos), enterprises, and service providers move network functions closer to workloads in the cloud and edge, new use cases are emerging that necessitate application acceleration capabilities on information handling system such as switches. Some examples of use cases include (but are not limited to): security features (e.g., Internet Protocol Security (IPSec)/ Secure Sockets Layer (SSL) tunnel termination, telemetry, Out-of-Band (OOB) statistics, Precision Time Protocol (PTP), Deep Packet Inspection, firewalls, secure enclaves for confidential computing, etc.).

Consider, by way of example, the following scenario. A user wants to enable IPSec on its datacenter's wide area network (WAN) uplinks. One alternative may be to implement the feature in software. However, implementing a high-level feature such as IPSec in software is very computationally expensive. In prototyping a software-based IPSec solution, it was observed that not only is it very host CPU (central processing unit) intensive, but it also affects other resources, like inundating the Host CPU-NPU (network processing unit) PCIe link.

Another option is to offload these functions to a dedicated feature card, in which the card plugs into the switchboard of the information handling system. However, there are several scenarios where this option may not be viable. First, such feature cards typically have to be plugged in at manufacturing time. Second, it is expensive to add the feature card. Such devices generally come configured with a base model; the added options involve additional handling (e.g., opening the device, installing the feature card, and closing the device). Third, if there is an issue with the feature card, the entire information handling system must be returned because in most cases there are warranty issues and/or the customers do not have the ability to replace the feature cards by themselves.

Accordingly, to address these issues, presented herein are embodiments that provide more efficient, more flexible, and more cost-effective ways to provide additional and/or increased functionality to an information handling system. Presented herein are embodiments of an application acceleration port interface module (which embodiments may be referred to herein for convenience as "AAPIM") that can receive pluggable IO (input/output) modules and the opposite ends of the modules are inserted into ports of an information handling system to supply increased capabilities to the information handling system. These AAPIM embodiments are versatile solutions to address application/services/ functionality acceleration needs that can be quickly reprogrammed to address specific needs of a user.

While there may be some single port (e.g., router-on-stick) or dongle-like transceivers that perform some limited application acceleration/packet loopbacks, there are no known solutions that provide the functionality, diversity, and ease of use that AAPIM embodiments can provide (e.g., such as NIC (network interface card)/DPU (data processing unit) like functionality or other types of functionality) via multiple ports for the same AAPIM appliance. One of the reasons why no multi-port solutions may previously have been tried is because of the alignment issues. However, as noted below, by building in some movement into ports and/or by design AAPIM embodiments to be correlated to the ports of a mating devices, this issue is resolved.

Also, a benefit of a multi-port device is that it can also consolidate traffic and functionality across the connected ports. That is, all the data from the ports connected to the AAPIM device is managed by that AAPIM device. In contrast, a set of single port devices would require additional overhead to manage data across the set of single port devices. Also, another benefit is that the AAPIM device has the ability to ingress and egress data on different connected ports, which is unavailable to a single port device. Also, having more ports for the AAPIM allows it more power so that it can run more powerful components (e.g., CPUs, FPGAs, ASICs, etc.) and allows it to handle more bandwidth. Other benefits of the AAPIM embodiments include their universality, which is due in part because their designs make no assumptions about the information handling systems' hardware capabilities or the host operating system (OS). Yet another benefit is the design of plugging in via the ports makes implementing them extremely easy (especially in the field)—a wide variety of features may be quickly and easily added to an existing information handling system. Furthermore, the design of AAPIM allows for a diversity of different types of AAPIMs to be made—each with its own set of features—thereby allowing customization of application acceleration solutions.

B. Application Acceleration Port Interface Module (AAPIM) Embodiments

In one or more embodiments, an AAPIM comprises an IO module that has N ports for receiving up to N pluggable modules that can be mechanically coupled with or inserted into aligned switch ports on a host information handling system (e.g., a host network switch). FIGS. 1A-D depict different views of an application acceleration port interface module (AAPIM), according to embodiments of the present disclosure.

FIG. 1A depicts a top view of an AAPIM 100, according to embodiments of the present disclosure. The depicted embodiment 100 comprises a small form factor chassis 102 that houses the functional components of the AAPIM embodiment and includes a plurality of ports 105 for receiving connectors 115 that interface with the AAPIM 100, wherein the connectors plug into ports using the other ends of the connectors.

FIG. 1B depicts a front view of the AAPIM 100, according to embodiments of the present disclosure. Depicted in this view is an AAPIM embodiment without any connectors inserted into the ports. The AAPIM embodiment has a plurality of ports 105, wherein one end of a pluggable connector is connected into a port 105 to interface with the functional components of the AAPIM 100 and the other end of the connector is inserted into a port of an information handling system. The depicted embodiment of FIG. 1B is a 4-port module (with ports numbered 1-4) that can receive up to 4 connectors that may be inserted into four contiguous ports on a host information handling system. It shall be noted that the AAPIM embodiments may have different numbers of ports and different configurations of the ports. For example, an AAPIM embodiment may have only 2 ports in a vertical, horizontal, or other orientation. Alternatively, an AAPIM embodiment may have many more ports in any of a number of configurations or patterns.

FIG. 1C depicts a side view of the AAPIM 100, according to embodiments of the present disclosure. As illustrated in the side view, the AAPIM embodiment 100 may include a number of vents 120 for air flow. The number, location, and arrangement of the air vents 120 may vary and may be determined based upon a number of factors including (but not limited to) thermal and structural considerations. In one or more embodiments, the AAPIM may also include one or more connectors/ports 125. The connectors may be for one or more purposes (including but not limited to): debugging, updating firmware or software, management control, diagnostics, power, etc. Additional or different connectors may be present, which are not depicted.

FIG. 1D depicts a three-dimensional view of the AAPIM 100, according to embodiments of the present disclosure. As illustrated in this view, the AAPIM embodiment 100 includes four pluggable modules 115, which may be, for example, QSFP28 transceivers (although it shall be noted that other pluggable modules may be used). In one or more embodiments, one end of a pluggable module 115 is inserted into ports or connectors in the AAPIM embodiment for the "system side" of the AAPIM and the other end of the pluggable modules 115, which represent the "line side," are inserted into ports in the information handling system. By the addition of the AAPIM embodiment to the information handling system via ports of the information handling system, the information handling system's functionality is increased.

Figure 2:
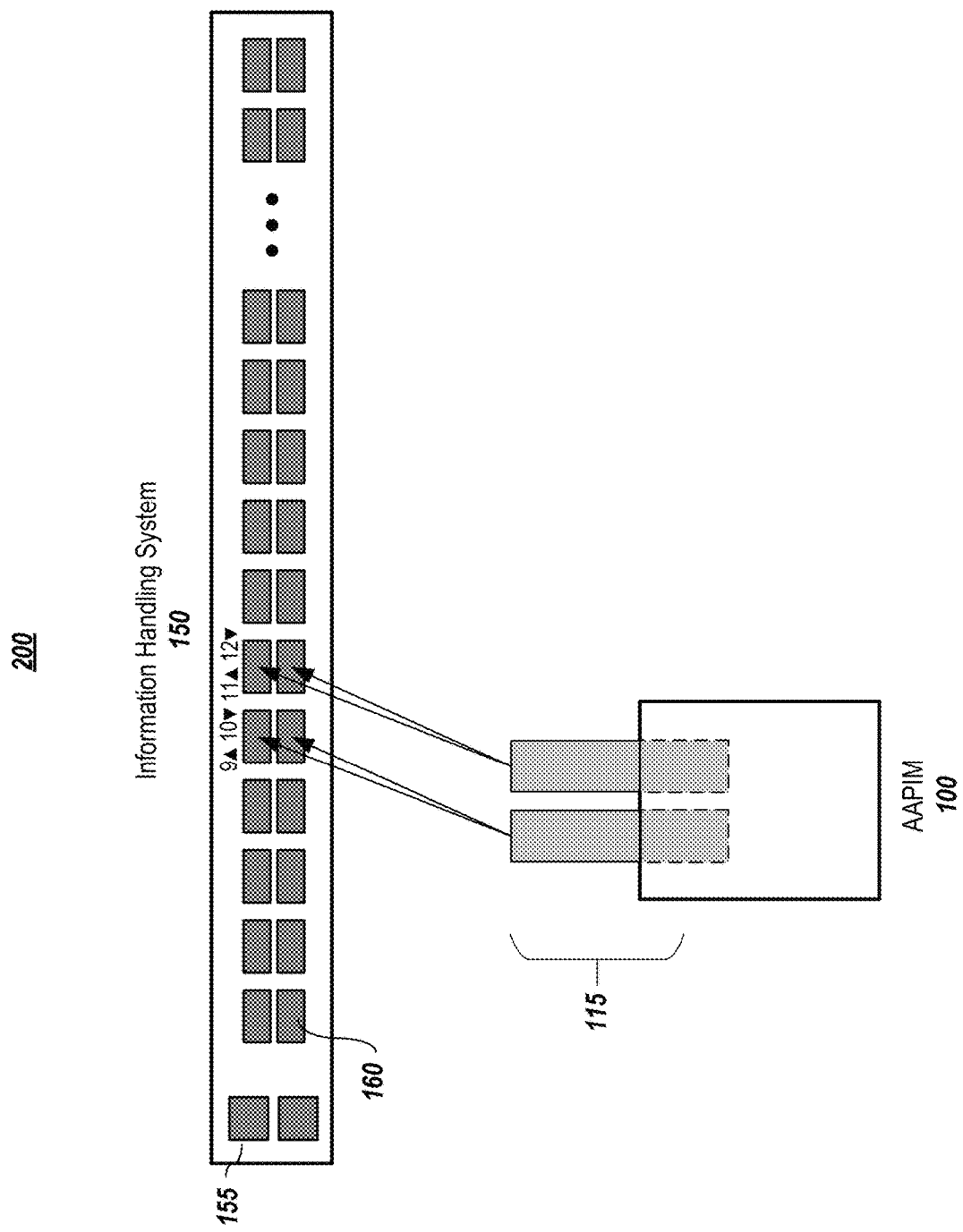
FIG. 2 depicts the connecting of an AAPIM embodiment to an information handling system, according to embodiments of the present disclosure.

FIG. 2 depicts the connecting of an AAPIM embodiment to an information handling system, according to embodiments of the present disclosure. In one or more embodiments, the information handling system 150 may be an Ethernet network switch, but it shall be noted that AAPIM embodiments may be used with other types of information handling systems. The depicted example network switch 150 includes two management ports 155 and a plurality of network ports 160. As illustrated, the AAPIM embodiment 100 is being inserted into the host network switch 150 in ports 9 through 12 in this example. It shall be noted that not all of the ports need be used. For example, the AAPIM embodiment may be inserted with just three ports. In one or more embodiments, if just two ports were being used, a different AAPIM embodiment with just two ports may be used instead, thereby not blocking any other ports on the information handling system 150 and allowing those ports to be used for other purposes. It should be noted that the depicted AAPIM embodiment may be inserted into any set of four contiguous ports (e.g., ports 17-20).

In one or more embodiments, an AASPIM device may be dimensioned to be coupled to a specific group of ports on an information handling system (including being configured to be used with specific information handling system(s)). Again, it shall be noted that while FIGS. 1A-D and 2 shows a 4-port AAPIM embodiment, other AAPIM embodiments may be built with different numbers of ports (e.g., 2, 3, 4, or 8 ports), different layouts (e.g., in block formation, all in-line horizon, in-line vertical), different configurations (e.g., in contiguous arrangement, patterned, skipping some ports, etc.) for different layouts, different compute abilities, different power arrangements, different network bandwidths to be delivered, and for different design reasons (e.g., spacing on racks, thermal factors, component sizes, etc.). Consider, by way of illustration, the AAPIM embodiment depicted in FIG. 3.

Figure 3:
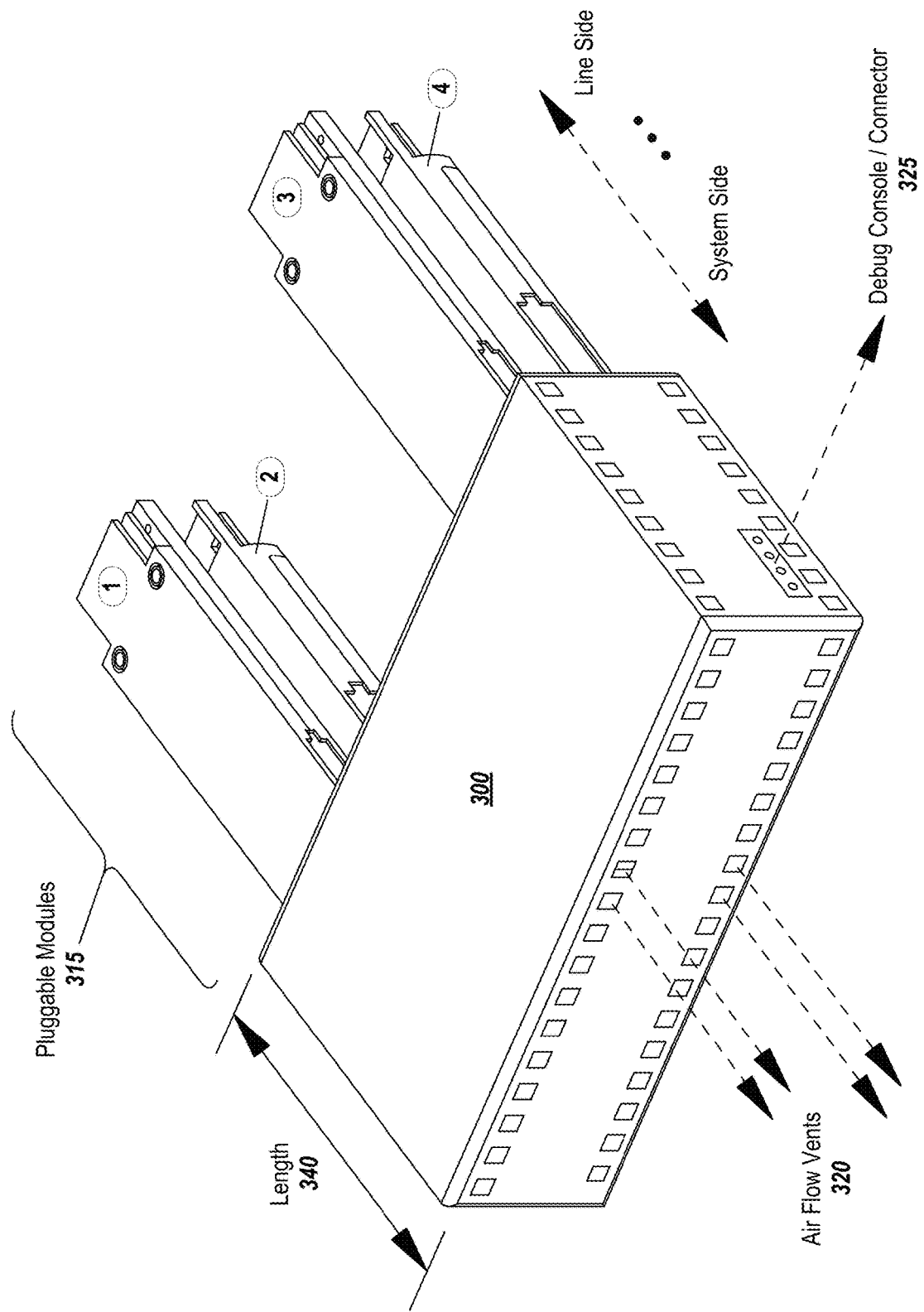
FIG. 3 depicts a three-dimensional view of an AAPIM, according to embodiments of the present disclosure.

FIG. 3 depicts a three-dimensional view of an AAPIM device, according to embodiments of the present disclosure. As illustrated in this view, the AAPIM embodiment 300 is a 6-port embodiment but only includes four pluggable modules 315. In one or more embodiments, the pluggable modules 315 may be inserted into the far end ports or connectors in the AAPIM embodiment to help make it more stable when inserted in a mating information handling system; however, it shall be noted that the four pluggable modules may be in any of the six ports. It shall also be noted that the AAPIM embodiments may be in different form factors or chassis configurations. Note that the depicted AAPIM embodiment 300 has a shorter length 340 than the embodiment 100 depicted in FIGS. 1A-D. The chassis configuration or form factor may vary depending upon expected usage or design configurations. For example, by having a short length 304, the AAPIM embodiment will stick out less when in mated position with the information handling system. Such information handling systems tend to be in racks in datacenters, and having a shorter profile reduces the chances of the AAPIM embodiment being knocked or hit when a person passes by the rack on which the information handling system with the AAPIM embodiment is housed.

Figure 4:
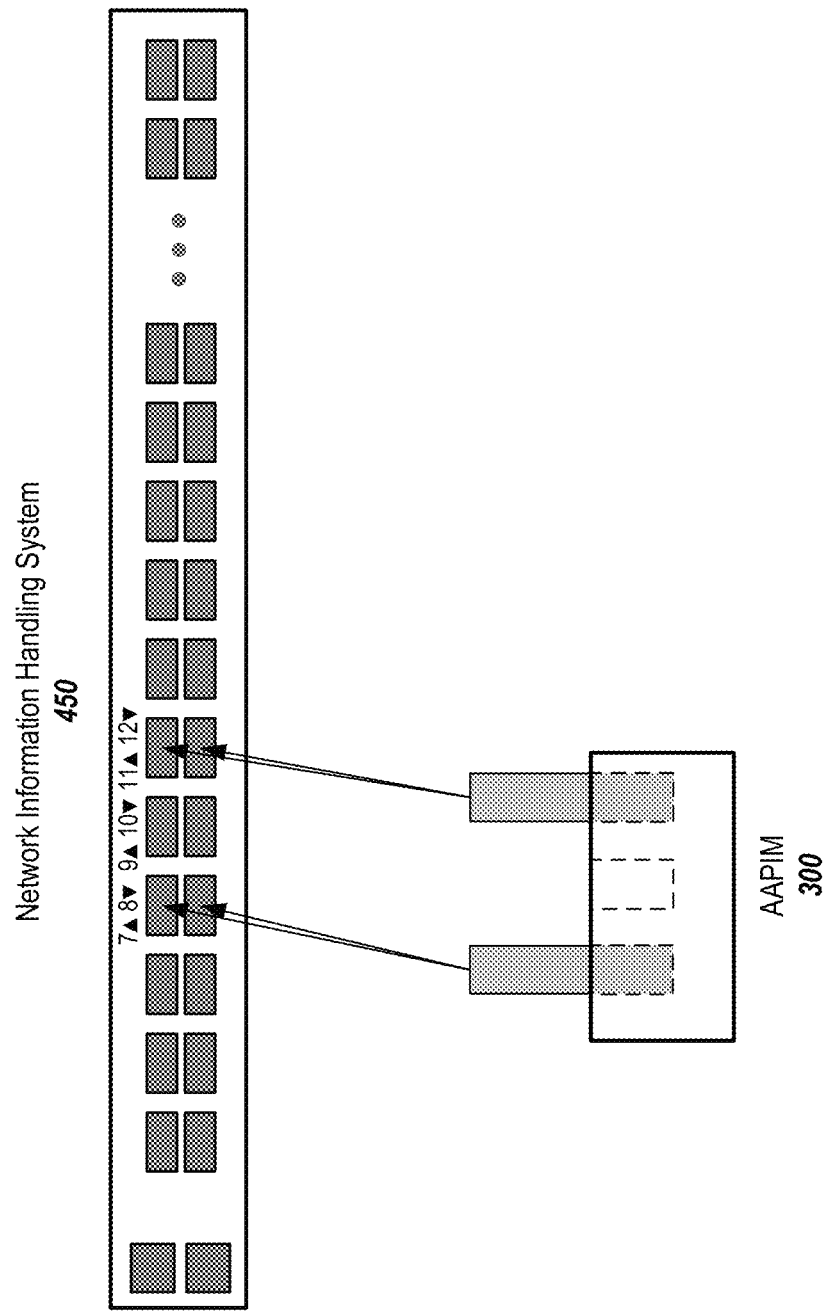
FIG. 4 depicts the connecting of the AAPIM embodiment of FIG. 3 to an information handling system, according to embodiments of the present disclosure.

FIG. 4 depicts the connecting of the AAPIM embodiment of FIG. 3 to an information handling system, according to embodiments of the present disclosure. In one or more embodiments, the information handling system 450 may be a network switch, but it shall be noted that AAPIM embodiments may be used with other types of information handling systems. As illustrated the AAPIM embodiment 300 is being inserted into the host network switch 350 in ports 7, 8, 11, and 12 in this example. Note that ports 9 and 10 are not being used. Thus, note that a non-contiguous set of ports are being used by the AAPIM embodiment. In one or more embodiments, dummy connectors (i.e., not functional) may be used for connecting the unused ports in the AAPIM embodiment for mating with ports 9 and 10 for any of a number of reasons, such as to provide additional power, to provide added structural support, or for other reasons.

Figure 5:
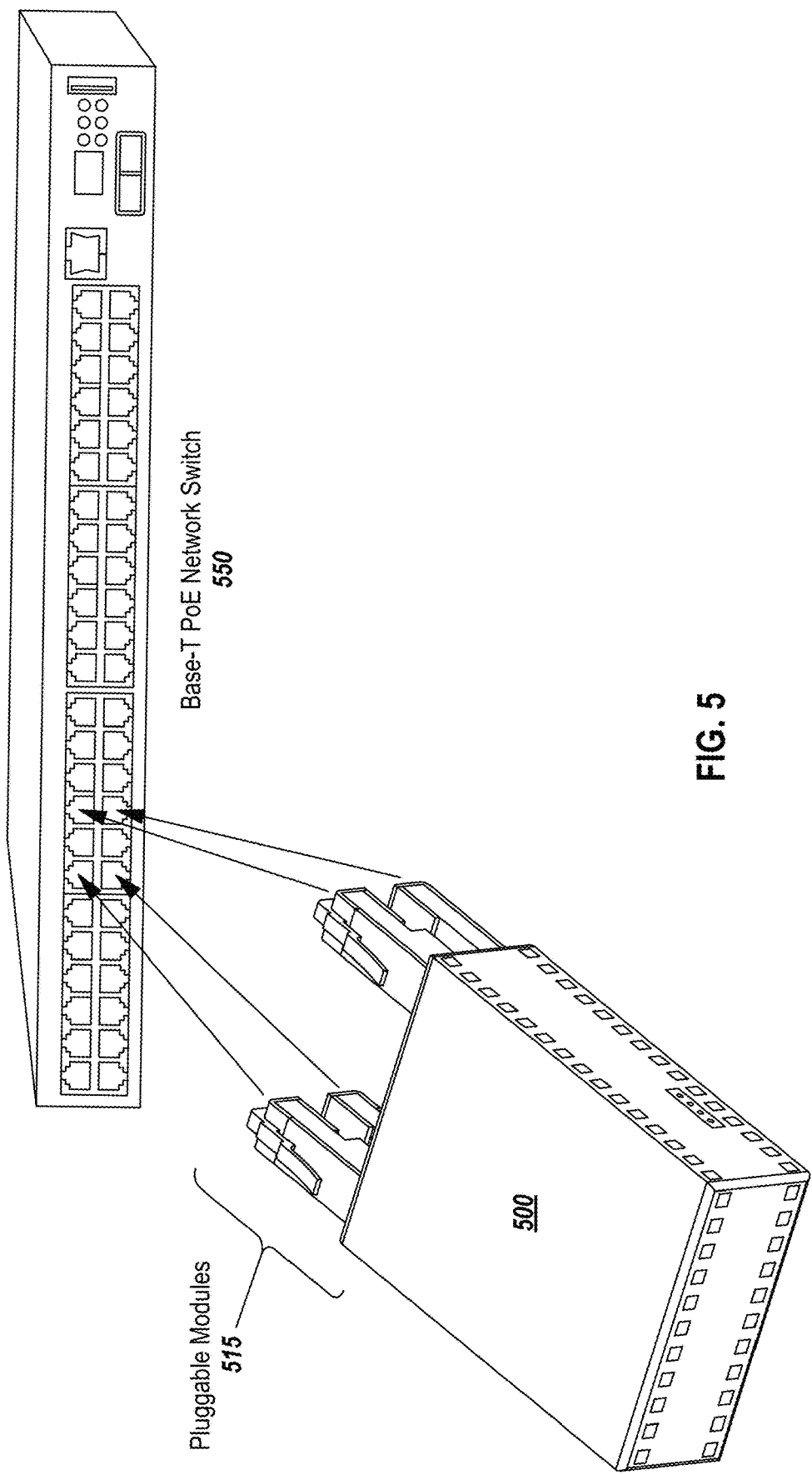
FIG. 5 depicts yet another embodiment of the connecting of an AAPIM embodiment into an information handling system, according to embodiments of the present disclosure.

FIG. 5 depicts yet another embodiment of the connecting of an AAPIM embodiment into an information handling system, according to embodiments of the present disclosure. In the depicted embodiment, the information handling system 550 is a Base-T Power-Over-Ethernet (PoE) network switch, but it shall be noted that AAPIM embodiments may be used with other types of information handling system. As illustrated the AAPIM embodiment 500 is being inserted into the host network switch 550 in ports 13, 14, 17, and 18. Note that ports 15 and 16 are not being used. Thus, note that a non-contiguous set of ports are being used by the AAPIM embodiment. In one or more embodiments, dummy connectors (not illustrated) may be used for connecting the unused ports in the AAPIM embodiment with ports 15 and 16.

Figure 6:
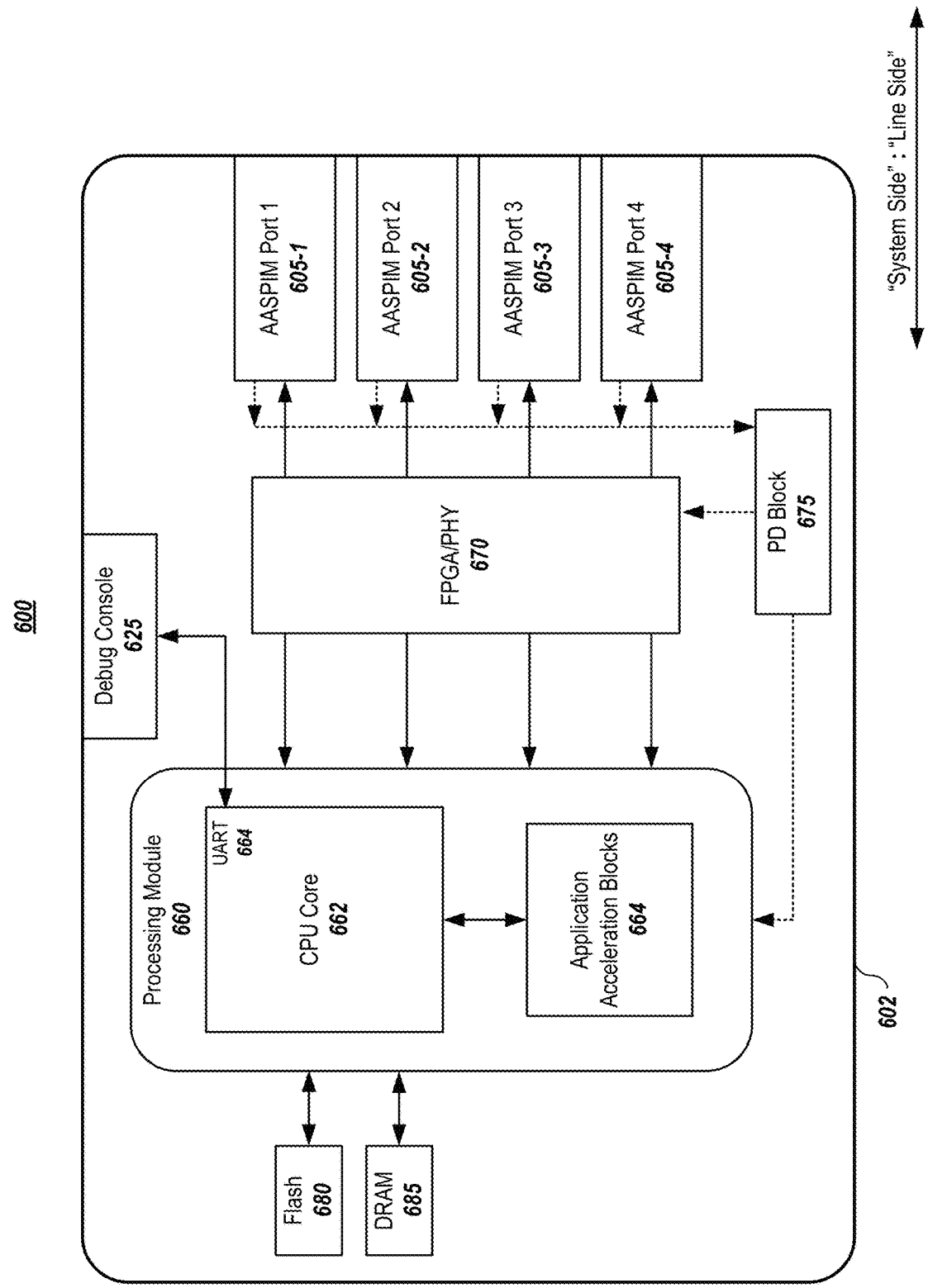
FIG. 6 depicts an example functional block diagram of an AAPIM device, according to embodiments of the present disclosure.

FIG. 6 depicts a functional block diagram of an AAPIM system, according to embodiments of the present disclosure. The depicted system 600 comprises a chassis 602 with a plurality of ports (in this case 4-ports 605-*x* but it shall be noted that different numbers of ports may be used). In one or more embodiments, the interfaces with the ports 605 (e.g., serializer/deserializer (or serdes) or other types of interfaces) from the system side of the pluggable modules may be routed to a processing module (or accelerator module) 660, which may be implemented as a system-on-a-chip (SoC), through an FPGA (field programmable gate array)/PHY (physical layer) module 670. In one or more embodiments, the AAPIM's processing module 660 may comprise a central processing unit (CPU) core 662 and one or more associated application acceleration blocks 664, which may support one or more functions. The number and type of applications that are supported by the AAPIM may depend upon the designed use (i.e., the applications the AAPIM is intended to provide or help support). In one or more embodiments, the acceleration blocks may be ASICs that help provide for faster processing than would occur in software.

As illustrated, the processing module 660 may be communicatively coupled to one or more memory components, such as flash memory 680 and/or random access memory (e.g., DRAM 685).

In one or more embodiments, power to the AAPIM 600 may be derived from the host information handling system via the pluggable modules or with PoE on ports in case of BaseT. Alternatively, or additionally, AAPIM embodiments may have a separate power source, including battery and/or plug-in power.

In one or more embodiments, the AAPIM device may comprise one or more connectors 625 for connecting with the AAPIM device for one or more purposes (including by not limited to): management services (e.g., debugging, updating firmware or software, management control, diagnostics, power, etc.) or for other reasons. In the depicted embodiment, the management connector is a debug console port 625 that is connected to the processing module 660 or CPU core 662 via a UART (universal asynchronous receiver-transmitter) 664. Additional or different connectors may be present, which are not depicted.

In one or more embodiments, the AAPIM device may include one or more indicators (e.g., a display and/or lights (e.g., single-color or multi-color light emitting diodes (LED)) for indicating Input/Output (I/O) exchanges, errors, ON/OFF status, or other information that may be useful to a user. In one or more embodiments, the AAPIM device may include an indicator for signaling to a user whether a pluggable transceiver is a correct component for the port on the information handling system.

In one or more embodiments, the AAPIM device may increase capabilities of the information handling system by providing new functionality via one or more services that the information handling system could not provide without the application acceleration device. In one or more embodiments, an information handling system may be configured to add a new service or application but might be limited to a software implementation; in contrast, an AAPIM device may provide the service or application but can do it more efficiently and quickly since it would not be a purely software implementation as in the information handling system. Alternatively, or additionally, the application acceleration device may increase capability of the information handling system by providing additional resource(s) (e.g., CPU, memory, services, etc.).

Examples of some of the functionality that may occur when an AAPIM embodiment is plugged into a host information handling system, which is running a host OS or host NOS (network OS), may be as follows.

In one or more embodiments, in situations in which the host information handling system is handling Ethernet function, the power distribution (PD) block 675 may derive power from the host information handling system, and the AAPIM embodiment's CPU core 662 starts a bootloader from memory (e.g., flash 680). In one or more embodiments, in situations in which the host information handling system is a BaseT information handling system, the PoE ports on the host information handling system may power the AAPIM device.

In one or more embodiments, the AAPIM device may be identified to the host system. For example, an Ethernet AAPIM embodiment may comprise a standard pluggable module EEPROM (electrically erasable programmable read-only memory) in each of the ports, which the host NOS may read to determine the type and capabilities of the AAPIM device. In the case of BaseT, the capabilities of an AAPIM embodiment may be shared with the host NOS via the LLDP-MED (Link Layer Discovery Protocol-Media Endpoint Discovery).

In one or more embodiments, an AAPIM bootloader may start a zero-touch process (ZTP) on one of the ports (e.g., port 1 605-1) and wait for the host NOS to assign an IP (internet protocol) address and subsequently provide an AAPIM-OS image to load.

Once the AASIM-OS is running, the host NOS may inject packets for application acceleration over one or more of the ports, and packets from the AAPIM may be injected into a host information handling system's NPU pipeline for further processing.

Some strategies for orchestrating packet flows to/from an AAPIM may be as follows (note that these examples are provided by way of illustration only and are not prescriptive):

(1) In one or more embodiments, all ports of an AAPIM device may be placed into a link aggregation group (LAG). Policy-based routing (PBR) may be used to direct incoming traffic to the AAPIM device. This routing may be done based on any of a number of factors (e.g., ingress port, flow, type of traffic, etc.) and may also depend on the service(s) needed. One or more lookup processes (e.g., done by the host's NPU) may handle forwarding of traffic returning from the AAPIM device.

(2) In one or more embodiments, a shim header may be used to retain the original ingress port of the packet so that it can be used for egress ACLs (access control lists) in the NPU after processing in the AAPIM or for functions within the AAPIM that require knowledge of the ingress port of the packet in the information handling system. This shim header may be the existing shim that the host NPU has, or a new one may be created. In one or more embodiments, the AAPIM device may create a final shim header for the packet so that it bypasses the regular lookup in the host information handling system, if so desired.

(3) In one or more embodiments, each ingress port to the AAPIM device may egress its traffic on the same port that it ingressed on into the AAPIM to ensure that there is no queueing in the AAPIM itself.

One skilled in the art shall recognize other features and functionality that may be implemented by the AAPIM embodiment or in the host information handling system to support specific application acceleration.

It shall also be noted that the AAPIM embodiment depicted in FIG. 6 illustrates the main functional block. Additional or different components may be used depending upon design considerations and/or the specific application(s) accelerated or supported by the AAPIM embodiment. For example, encryption/decryption modules may be included for security features. Also, for example, one or more fans may be included for thermal considerations.

By way of further example, in one or more embodiments, the port connectors 605 may include some float in order to accommodate mechanical variation in the port alignment with the host information handling system. Consider the following embodiment which is provided by way of illustration only.

Figure 7:
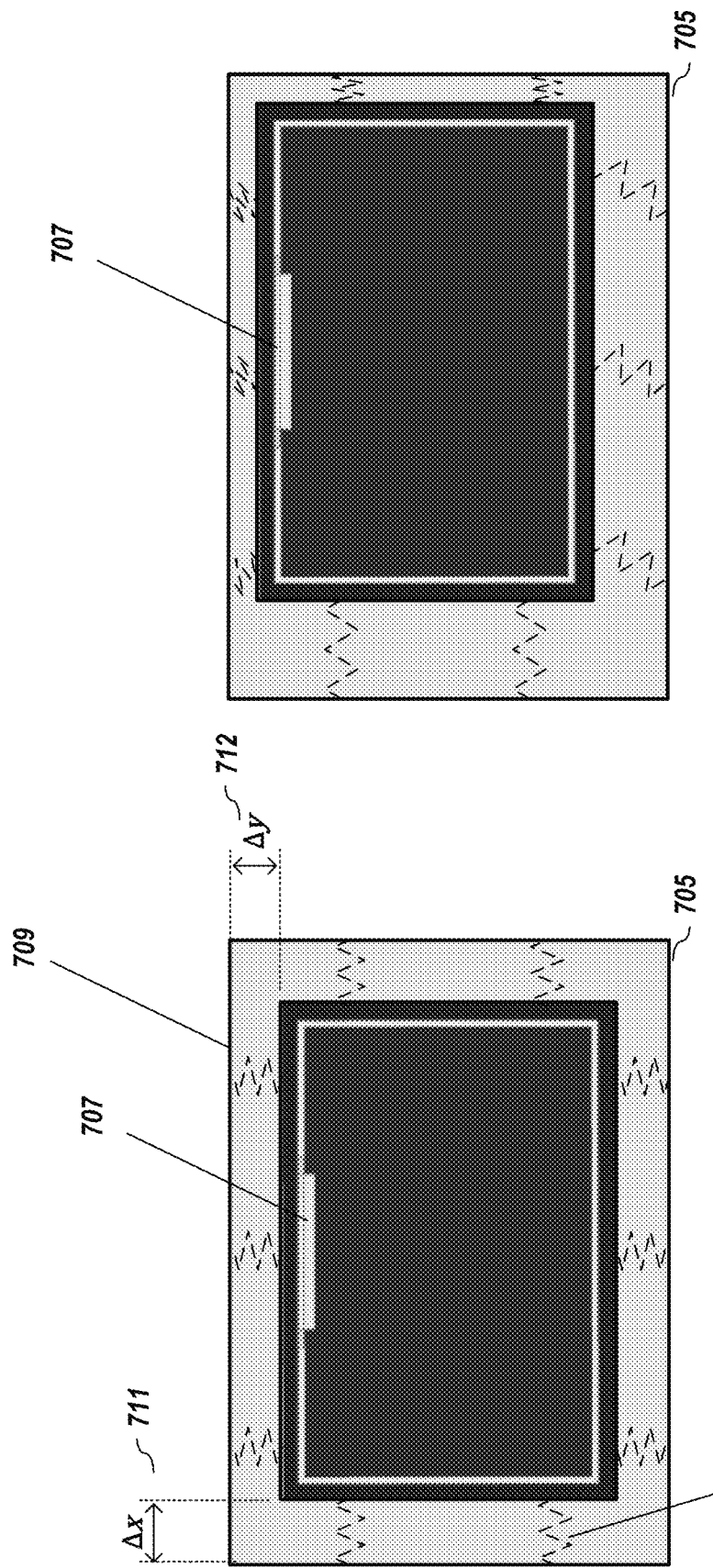
FIG. 7A depicts a port connector of an AAPIM device, according to embodiments of the present disclosure.
FIG. 7B depicts an example of a port connector that is shifted within the chassis of an AAPIM device, according to embodiments of the present disclosure.

FIG. 7A depicts a port connector 705, which may be port connector 605 in FIG. 6, according to embodiments of the present disclosure. The depicted port 705 comprises a port opening 707 for receiving a mating pluggable connector and has an outer housing 709 that is within the chassis of the AAPIM device. As illustrated, the port connector 707 is predisposed to be in the center of the outer housing 709 but is movable relative to the outer housing 709. In one or more embodiments, the port connecter 707 may be held into position by one or more components that allow for movement (e.g., springs 717). In one or more embodiments, the springs may provide rigidity that helps keep the AAPIM device in place when connected to a mating information handling system. Thus, the port connector 707 has some tolerance (i.e., $2\times\Delta x$ and $2\times\Delta y$) or moveability when lining up with ports of a mating information handling system to account for variance in port positions. In one or more embodiments, the back end of the port may be a cable so that its movement does not cause connectors to break due to movement of the port connector 707. It shall be noted that other types of movement connectors may also be used, including (but not limited to) compliant mechanisms, springs, gearing, slots, flexible connectors, etc. FIG. 7B depicts an example of the port connector 707 of the port 705 that is shifted, according to embodiments of the present disclosure. It shall be noted that the float movability may be limited to one direction (or may be allowed more in one direction).

Thus, one skilled in the art shall recognize the diverse array of components and functional support that may exist for an AAPIM, but such variants shall be considered to fall within the scope of the present disclosure.

In one or more embodiments, an AAPIM may include or be configured to support one or more security functions. For example, an AAPIM may ensure that a module being plugged is authenticated. One or more of the systems, methods, or both discussed in commonly-owned U.S. Pat. No. 9,652,253 filed on 16 Sep. 2015, titled "FIELD REPLACEABLE UNIT AUTHENTICATION SYSTEM," and listing Padmanabhan Narayanan, and Rajasekhar Pulluru as inventors, and U.S. Pat. No. 10,057,221 filed on 16 Mar. 2017, titled "FIELD REPLACEABLE UNIT AUTHENTICATION SYSTEM," and listing Padmanabhan Narayanan, and Rajasekhar Pulluru as inventors, may be used; each of the aforementioned patents is incorporated by reference herein in its entirety. In one or more additional or alternative embodiments, the mating information handling system may first perform security function (e.g., authentication) before granting access for the AAPIM module.

It shall be noted that embodiments of the AAPIM allow applications to perform value-added functions (such as packet transformations or inference) that may not otherwise be available to an information handling system. As noted above, AAPIM embodiments interface with a host information handling system via a set of ports using a set of compatible transceivers or connectors to derive power and data connectivity. This connection type makes expanding the computational resources and/or functional services of an information handling system easy and convenient. Also, it shall be noted that more than one AAPIM (e.g., the one type or different type of AAPIM) may be added to an information handling system, which allows for diverse flexibility in support for the host information handling system. AAPIM embodiments provide a wide range of flexibility in addressing a variety of enhanced solution needs without burdening the host CPU or requiring factory installed acceleration options or separate power of standalone devices. Also, AAPIM embodiments also allow information handling system providers to design, develop, and maintain custom solutions for niche markets that may otherwise be not feasible or sustainable.

C. Information Handling System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more drives (e.g., hard disk drives, solid state drive, or both), one or more network ports for communicating with external devices as well as various input and output (I/O) devices. The computing system may also include one or more buses operable to transmit communications between the various hardware components.

Figure 8:
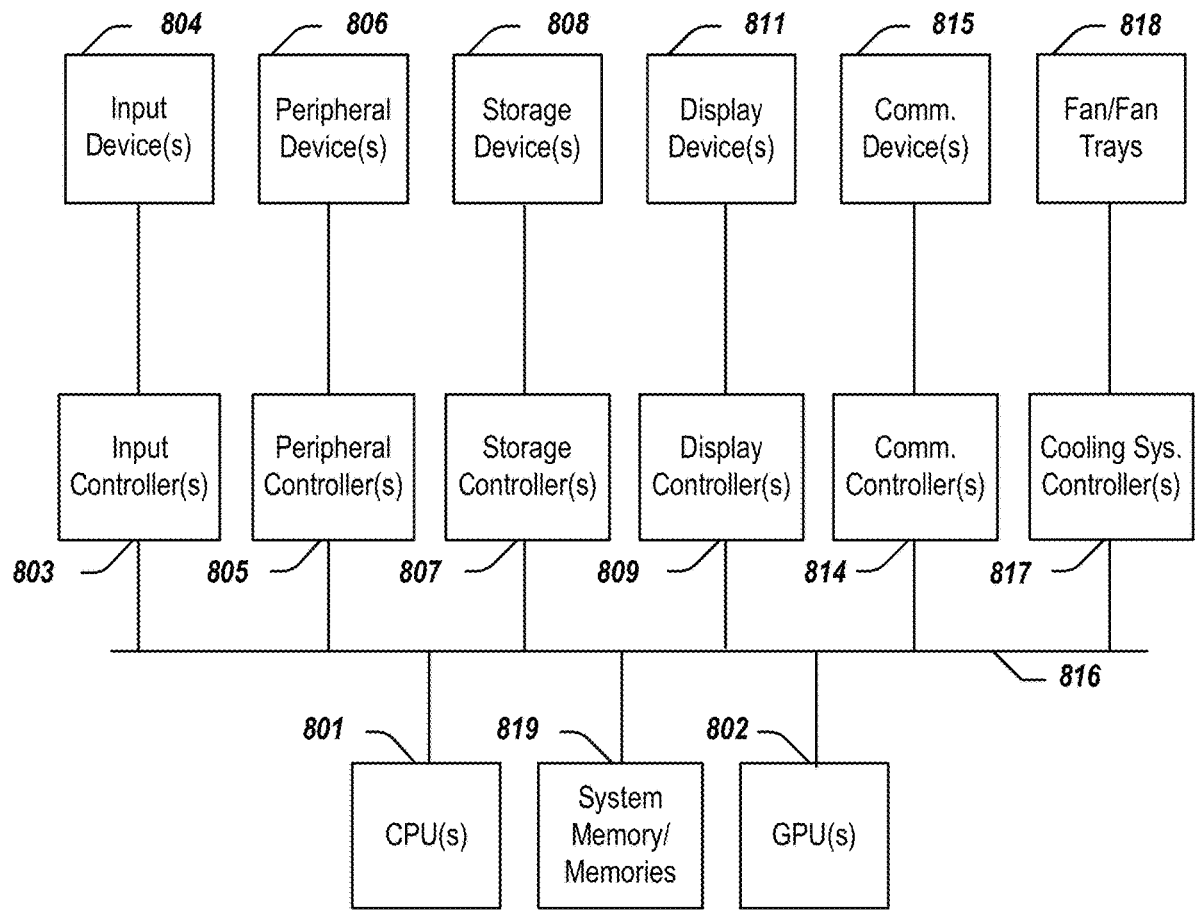
FIG. 8 depicts a simplified block diagram of an information handling system, according to embodiments of the present disclosure.

FIG. 8 depicts a simplified block diagram of an information handling system (or computing system), according to embodiments of the present disclosure. It will be understood that the functionalities shown for system 800 may operate to support various embodiments of a computing system—although it shall be understood that a computing system may be differently configured and include different components, including having fewer or more components as depicted in FIG. 8.

As illustrated in FIG. 8, the computing system 800 includes one or more CPUs 801 that provides computing resources and controls the computer. CPU 801 may be implemented with a microprocessor or the like and may also include one or more graphics processing units (GPU) 802 and/or a floating-point coprocessor for mathematical computations. In one or more embodiments, one or more GPUs 802 may be incorporated within the display controller 809, such as part of a graphics card or cards. The system 800 may also include a system memory 819, which may comprise RAM, ROM, or both.

A number of controllers and peripheral devices may also be provided, as shown in FIG. 8. An input controller 803 represents an interface to various input device(s) 804, such as a keyboard, mouse, touchscreen, stylus, microphone, camera, trackpad, display, etc. The computing system 800 may also include a storage controller 807 for interfacing with one or more storage devices 808 each of which includes a storage medium such as magnetic tape or disk, or an optical medium that might be used to record programs of instructions for operating systems, utilities, and applications, which may include embodiments of programs that implement various aspects of the present disclosure. Storage device(s) 808 may also be used to store processed data or data to be processed in accordance with the disclosure. The system 800 may also include a display controller 809 for providing an interface to a display device 811, which may be a cathode ray tube (CRT) display, a thin film transistor (TFT) display, organic light-emitting diode, electroluminescent panel, plasma panel, or any other type of display. The computing system 800 may also include one or more peripheral controllers or interfaces 805 for one or more peripherals 806. Examples of peripherals may include one or more printers, scanners, input devices, output devices, sensors, and the like. A communications controller 814 may interface with one or more communication devices 815, which enables the system 800 to connect to remote devices through any of a variety of networks including the Internet, a cloud resource (e.g., an Ethernet cloud, a Fibre Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 800 comprises one or more fans or fan trays 818 and a cooling subsystem controller or controllers 817 that monitors thermal temperature(s) of the system 800 (or components thereof) and operates the fans/fan trays 818 to help regulate the temperature.

In the illustrated system, all major system components may connect to a bus 816, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable media including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Figure 9:
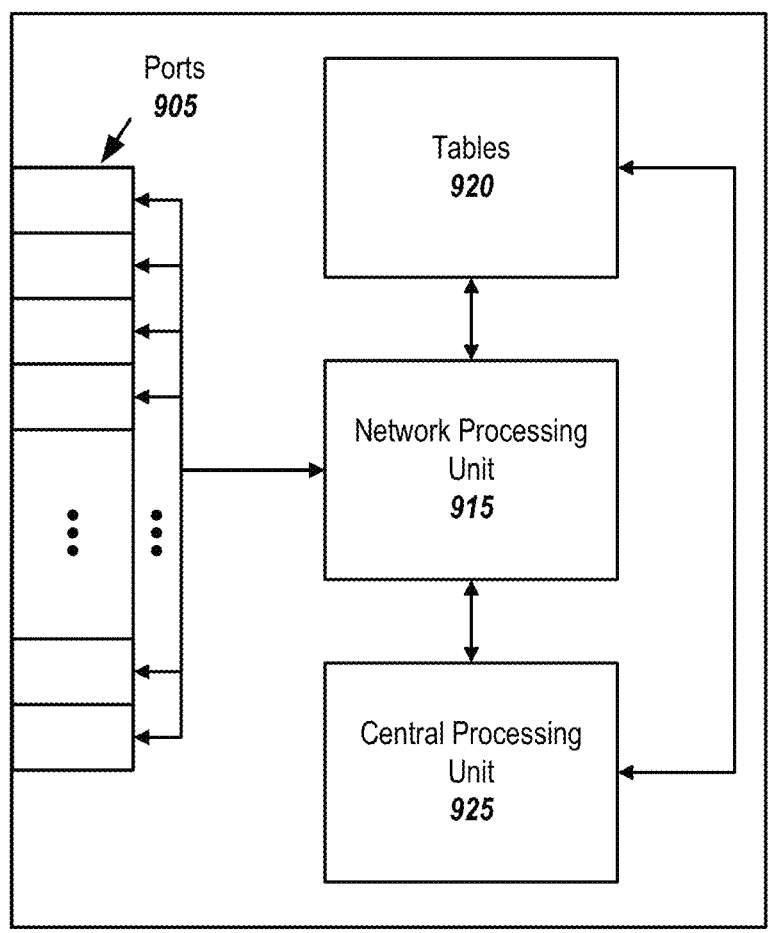
FIG. 9 depicts an alternative block diagram of an information handling system, according to embodiments of the present disclosure.

FIG. 9 depicts an alternative block diagram of an information handling system, according to embodiments of the present disclosure. It will be understood that the functionalities shown for system 900 may operate to support various embodiments of the present disclosure—although it shall be understood that such system may be differently configured and include different components, additional components, or fewer components.

The information handling system 900 may include a plurality of I/O ports 905, a network processing unit (NPU) 915, one or more tables 920, and a CPU 925. The system includes a power supply (not shown) and may also include other components, which are not shown for sake of simplicity.

In one or more embodiments, the I/O ports 905 may be connected via one or more cables to one or more other network devices or clients. The network processing unit 915 may use information included in the network data received at the node 900, as well as information stored in the tables 920, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as compact discs (CDs) and holographic devices; magneto-optical media; and hardware devices that are specially configured to store or to store and execute program code, such as ASICs, PLDs, flash memory devices, other non-volatile memory devices (such as 3D XPoint-based devices), ROM, and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. An application acceleration device for increasing capability of an information handling system, the application acceleration device comprising:
    a chassis that is separate from the information handling system's chassis;
    a plurality of ports, each port configured to receive one end of a pluggable module, in which another end of the pluggable module is configured to connect with an information handling system via a port in the information handling system, and the application acceleration device is configured to connect with the information handling system using at least two pluggable modules that physically support the application acceleration device when connected to the information handling system;
    a processing module, comprising one or more application accelerators, which is communicatively coupled to the plurality of ports, in which the processing module receives data from the information handling system via at least one of the ports of the plurality of ports and performs one or more services for the information handling system;
    a non-transitory memory communicatively coupled to the processing module; and
    a power distribution block coupled to the ports and to the processing module for facilitating power to the processing module.

2. The application acceleration device of claim 1 wherein the pluggable modules are not built into the application acceleration device or the information handling system.

3. The application acceleration device of claim 1 wherein the application acceleration device increases capability of the information handling system by providing additional capabilities via resources of the application acceleration device.

4. The application acceleration device of claim 1 further comprising:
    a management connector for interfacing with the application acceleration device for management services.

5. The application acceleration device of claim 1 wherein the power distribution block receives power from the information handling system via one or more of the connected ports and distributes power to components of the application acceleration device.

6. The application acceleration device of claim 1 wherein the processing module is communicatively coupled to the plurality of ports via one or more physical layer modules.

7. The application acceleration device of claim 1 wherein the ports comprise a port connector and an outer port housing, in which the port connector is moveable relative to outer port housing to accommodate for variance in port positions in the information handling system.

8. The application acceleration device of claim 1 wherein the at least two ports are contiguous on the information handling system or wherein the at least two ports are not contiguous on the information handling system.

9. The application acceleration device of claim 1 further comprising an EEPROM (electrically erasable programmable read-only memory), which is readable by the information handling system to allow it to determine information about the application acceleration device.

10. A computer-implemented method for using an accelerator device comprising:
    supplementing capability of an information handling system, via the accelerator device, in which, for each port of a least two ports of the accelerator device, a first end of a pluggable module has been inserted into the port of the accelerator device and a second end of the pluggable module has been inserted into a port of the information handling system,
wherein the accelerator device comprises:
   a plurality of ports;
   an accelerator module, which is communicatively coupled to at least some of the plurality of ports, that receives data from the information handling system, transmits data to the information handling system, or both via at least one of the ports of the plurality of ports and provides one or more services, features, resources, or capabilities;
   a non-transitory memory communicatively coupled to the accelerator module;
   a power distribution block coupled to the accelerator module that receives power from the information handling system via at least one of the ports and facilitates power to the accelerator module; and
   a chassis that houses the plurality of ports, the accelerator module, the non-transitory memory, and the power distribution block; and
   wherein the accelerator device is physically supported by the pluggable modules when connected to the information handling system.

11. The computer-implemented method of claim 10 wherein the accelerator device comprises a bootloader that, when powered, starts a process for receiving an accelerator device operation system from the information handling system.

12. An accelerator device comprising:
   a plurality of ports, each port configured to receive one end of a connector, in which another end of the connector connects with an information handling system via a port in the information handling system, and the accelerator device is configured to communicatively couple with and physically connect to the information handling system using at least two connectors;
   an accelerator module, which is communicatively coupled to the plurality of ports, in which the accelerator module receives data from the information handling system via at least one of the ports of the plurality of ports and performs one or more services for the information handling system;
   a non-transitory memory communicatively coupled to the accelerator module;
   a power distribution block coupled to the accelerator module that receives power from the information handling system via at least one of the ports and facilitates power to the accelerator module; and
   a chassis that houses the plurality of ports, the accelerator module, the non-transitory memory, and the power distribution block and that is physically supported by a plurality of connectors when connected to the information handling system.

13. The accelerator device of claim 12 wherein the connector is a small form pluggable transceiver.

14. The accelerator device of claim 12 further comprising:
   a debug console connector for interfacing with the accelerator module of the accelerator device.

15. The accelerator device of claim 12 wherein the chassis comprises one or more air flow vents.

16. The accelerator device of claim 15 further comprising one or more fans for cooling.

17. The accelerator device of claim 12 wherein the accelerator module is communicatively coupled to the plurality of ports via one or more physical layer modules.

18. The accelerator device of claim 12 wherein the ports are moveable relative to each other within the chassis to accommodate for variance in port positions in the information handling system.

19. The accelerator device of claim 12 wherein the at least two ports are contiguous on the information handling system or are not contiguous on the information handling system.

20. The accelerator device of claim 12 further comprising an EEPROM (electrically erasable programmable read-only memory), which is readable by the information handling system to allow it to determine information about the acceleration device.

* * * * *